(12) United States Patent
Matsunaga

(10) Patent No.: US 6,921,207 B2
(45) Date of Patent: Jul. 26, 2005

(54) FOIL BEARING

(75) Inventor: Minoru Matsunaga, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/644,974

(22) Filed: Aug. 21, 2003

(65) Prior Publication Data

US 2004/0042692 A1 Mar. 4, 2004

(30) Foreign Application Priority Data

Aug. 28, 2002 (JP) .......................................... 2002-249113

(51) Int. Cl.⁷ .............................................. F16C 32/04
(52) U.S. Cl. ........................ 384/103; 105/106; 310/90.5
(58) Field of Search .................................. 384/103, 104, 384/105, 106; 310/90.5

(56) References Cited

U.S. PATENT DOCUMENTS 3,893,733 A 7/1975 Silver et al.
4,128,280 A 12/1978 Purtschert
4,178,046 A 12/1979 Silver et al.
4,445,792 A 5/1984 Trippett

FOREIGN PATENT DOCUMENTS

JP 10-292818 11/1998

*Primary Examiner*—Lenard A. Footland
(74) *Attorney, Agent, or Firm*—Squire, Sanders & Dempsey L.L.P.

(57) ABSTRACT

In a foil bearing (23) having a plurality of foils (26) disposed in a gap between a rotating member (12) and a stationary mount member (25), a circumferentially extending portion of each foil and a moveable member (27) rotatable with respect to the stationary mount member are provided with magnets (30, 31) so that a magnetic force between these magnets urges the foils toward the rotating member. By rotating the moveable member to vary the relative circumferential position of the moveable member with respect to the foils, it is possible to adjust an amount of magnetic force between the magnets of the moveable member and the magnets of the foils.

12 Claims, 10 Drawing Sheets

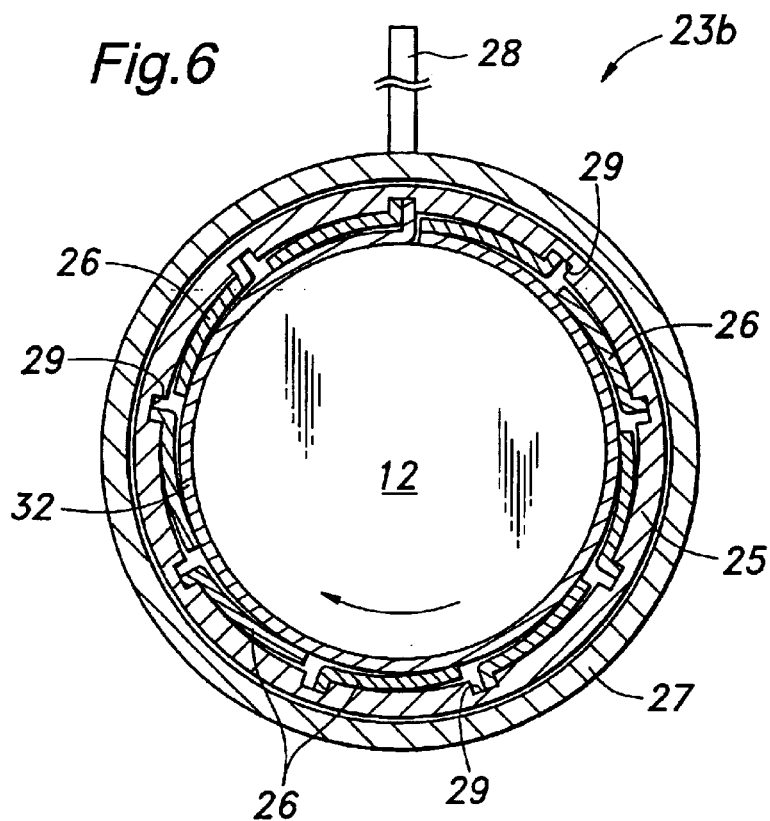
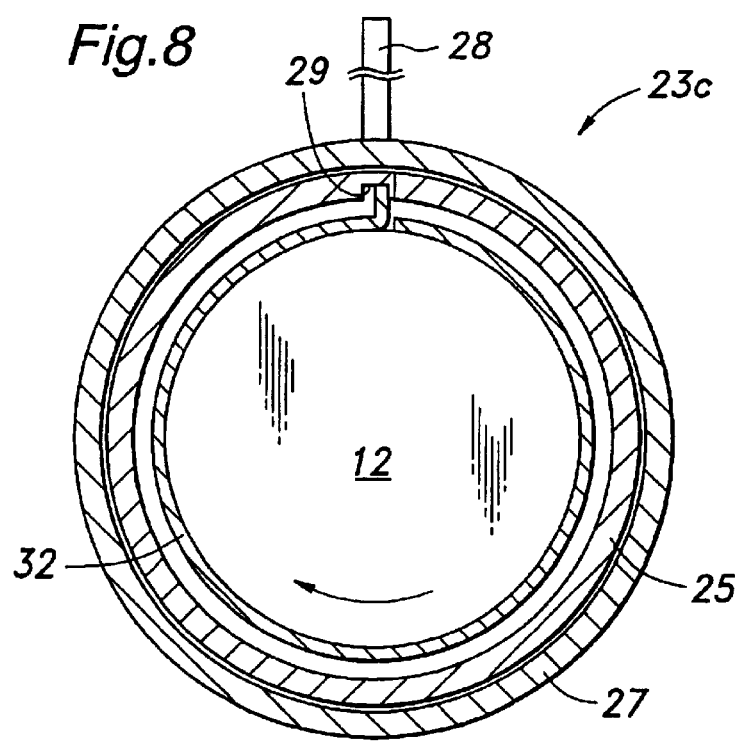

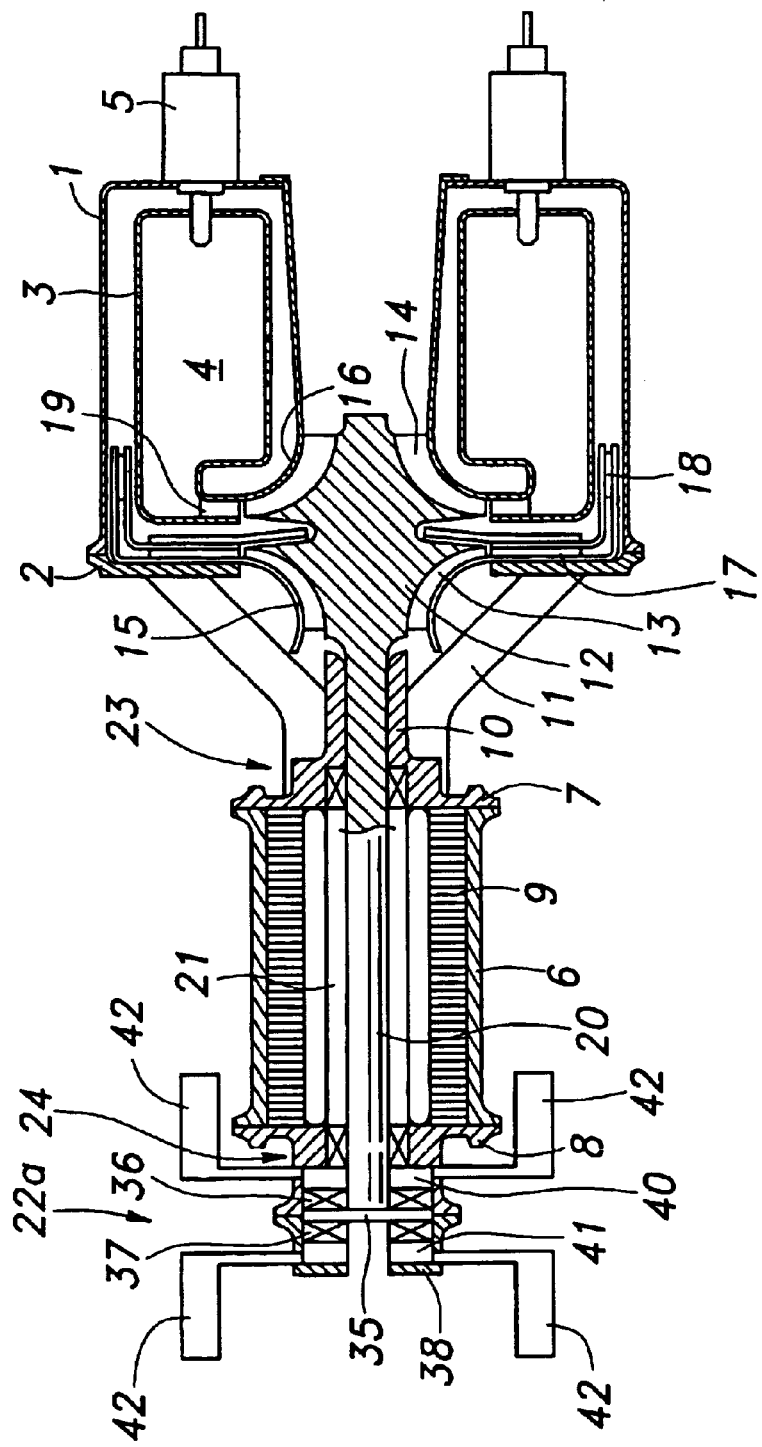

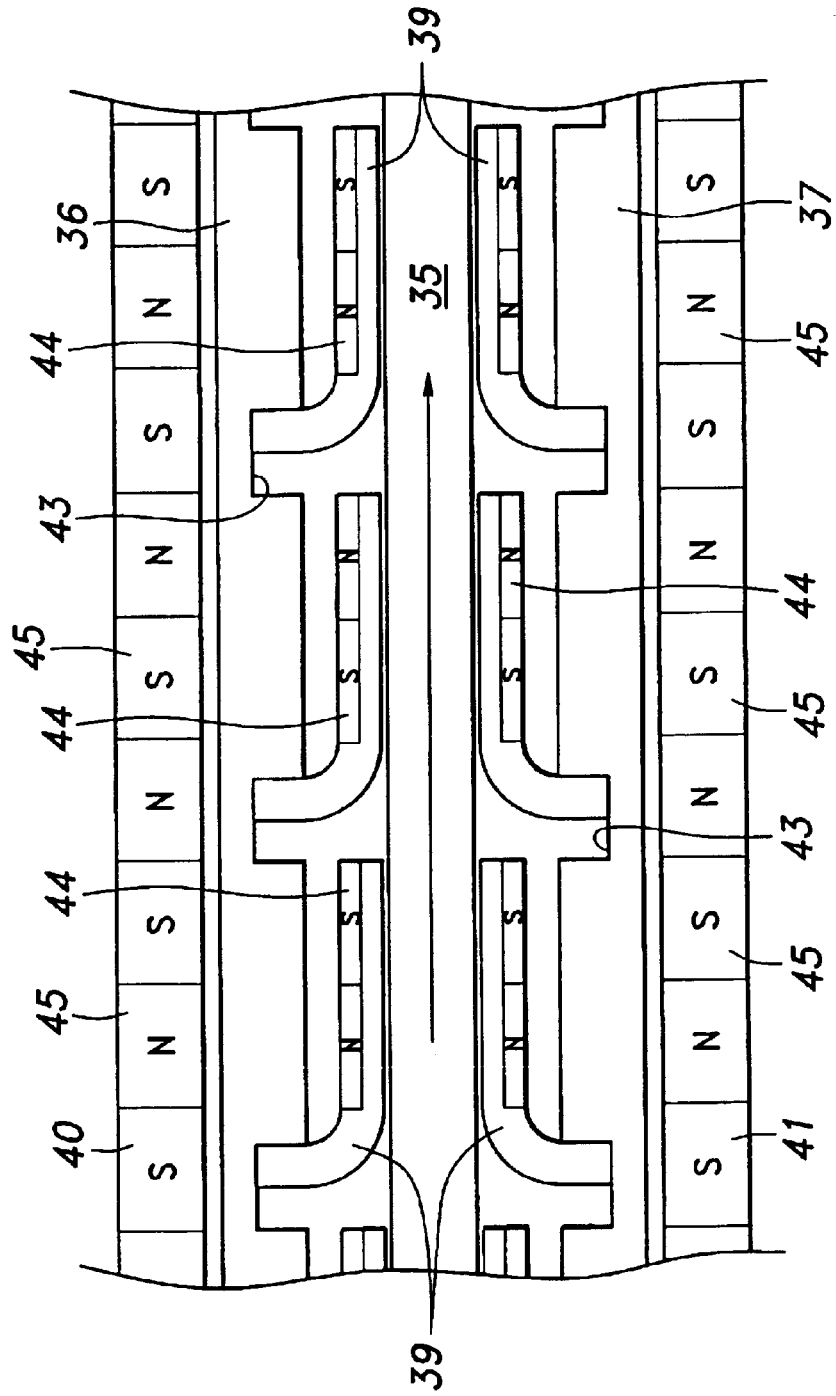

FOIL BEARING

TECHNICAL FIELD

The present invention relates to foil bearings. Particularly, the present invention relates to foil bearings suitable for use as a journal bearing or thrust bearing for a rotor shaft of a micro gas turbine generator.

BACKGROUND OF THE INVENTION

It has been conventionally known to use a foil bearing as a bearing for a rotor shaft. A foil bearing typically comprises a housing surrounding the rotor shaft and a plurality of foils disposed in a space or gap between the rotor shaft and the housing and arranged in a circumferential direction in such a manner that each of the foils is attached to the housing in a cantilever fashion with its free end being urged toward the rotor shaft. As the rotor shaft rotates, a fluid such as ambient air is drawn in between the rotor shaft and the foils, creating a fluid film between an outer surface of the rotor shaft and the foils to allow the rotor shaft to rotate with low friction. Such a foil bearing that supports a load of the rotor shaft via the fluid film formed as a result of the rotor shaft rotation may be called a hydrodynamic foil bearing.

In the foil bearing as described above, characteristics of the fluid film formed between the rotor shaft and the foils may vary between a state where the rotor shaft rotation speed is low, e.g., at the start up or shut down, and a state where the rotor shaft rotation speed is high. Thus, in order to achieve a stable rotation in both states, it is desired that a preload of the foils against the rotor shaft is adjustable according to the rotation speed of the rotor shaft.

U.S. Pat. No. 4,445,792 issued to Trippett has disclosed a foil bearing in that the preload of the foils can be adjusted. The foil bearing has a housing surrounding the rotor shaft, and a plurality of foil mounts arranged along the circumferential surface of the rotor shaft and rotatably supported relative to the housing, wherein each mount has a foil attached thereto to cantilever the foils and has a driven portion. Further, a drive mechanism (ring gear) rotatable relative to the housing is provided outside the housing so as to be engageable with the driven portions of the foil mounts to simultaneously rotate the mounts and vary the preload of the foils against the shaft surface.

In such a foil bearing, however, the preload of the foils against the rotor shaft relies upon an elasticity of each foil, and thus it is difficult to vary the preload in a sufficiently large range, and further, an excessive force tends to concentrate on a root portion of each cantilevered foil.

Other known prior art may include U.S. Pat. No. 3,893,733 issued to Silver et al, which has disclosed to use foil supports that slidingly contact the foils to increase the stiffness (or rigidity) of the foils. U.S. Pat. No. 4,178,046 issued to Silver et al has disclosed a foil bearing in that each foil is mounted intermediate the ends thereof. U.S. Pat. No. 4,128,280 issued to Purtschert has disclosed various types of floating gas bearing utilizing a magnet in the bearing. Further, Japanese Patent Application Laid-Open (kokai) No. 10-292818 has disclosed to use a thrust magnetic bearing to assist a hydrodynamic gas bearing at low rotational speed of the rotor shaft.

BRIEF SUMMARY OF THE INVENTION

In view of such problems of the prior art, a primary object of the present invention is to provide a foil bearing that can allow stiffness or preload of foils against a rotating member, such as a rotor shaft, to be varied in a wide range to ensure stable rotation of the rotating member at both low and high rotation speed regions, while avoiding an excessive force applied locally on a part of each foil.

A second object of the present invention is to provide such a foil bearing simple in structure and low at cost.

According to the present invention, such objects can be accomplished by providing a foil bearing for supporting a rotating member that rotates about an axis, comprising: a stationary mount member spaced from the rotating member so that a gap is defined between the stationary mount member and the rotating member; a moveable member rotatable about the axis; and a first foil disposed in the gap between the rotating member and the stationary mount member to support the rotating member via a fluid film when the rotating member rotates, wherein the first foil comprises a substantially circumferentially extending portion to which a first magnet is provided; wherein the moveable member is provided with a second magnet so that a magnetic force between the first magnet and the second magnet can urge the first foil toward the rotating member; and wherein an amplitude of the magnetic force can be adjusted by rotating the moveable member around the axis to vary a relative circumferential position between the first magnet and the second magnet.

Thus, according to the present invention, the interaction between the magnets provided to the moveable member and the magnets provided to the circumferentially extending portions of the foils can create a force urging the foils toward the rotating member, and the urging force can be adjusted by rotating the moveable member and thereby varying the position thereof relative to the foils. Thus, when the present invention is applied to the journal bearing and/or thrust bearing of a gas turbine engine, it is possible to control the angular position of the moveable member according to the rotational speed of the gas turbine engine, thereby creating an urging force (or preload) suitable for the rotational speed so that favorable bearing properties can be achieved for a wide range covering the low to high rotational speed regions. Further, the urging force acts upon the circumferentially extending portion of each foil, and thus concentration of an excessive force on the root portion (or bending portion) of the foil can be avoided.

When the foil bearing comprises a plurality of the first foils arranged in a circumferential direction of the rotating member, at least one of the plurality of first foils may be provided with the first magnet. In the case that a rotor shaft is used as the rotating member, for example, only a part of the first foils positioned on a lower side of the rotor shaft and thus supporting the weight of the rotor shaft may be provided with the first magnet. It is also possible that each of the first foils is provided with the first magnet.

When the foil bearing comprises a plurality of the first foils and the moveable member is provided with a plurality of the second magnets, the second magnets may have varying magnetic strengths. In the case that a rotor shaft is used as the rotating member, for example, those of the second magnets associated with the first foils disposed on the lower side of the rotor shaft may preferably have a greater strength than those of the second magnets associated with the first foils disposed on the upper side of the rotor shaft to whereby compensate the effects of the rotor shaft weight. Alternatively or additionally, the first magnets provided to the first foils may have varying magnetic strengths. It is also possible that spaces between adjacent ones of the plurality of first foils are varied.

In one embodiment of the present invention, the rotating member comprises a shaft having a substantially cylindrical portion, and the stationary mount member surrounds the shaft so that the gap is formed as an annular gap defined between a cylindrical surface of the cylindrical portion of the shaft and the stationary mount member. In such a case, if the shaft consists of a rotor shaft of a gas turbine engine, the foil bearing can constitute a journal bearing for the rotor shaft of the gas turbine engine.

When the foil bearing comprises a plurality of the first foils arranged in a circumferential direction of the shaft serving as the rotating member, a second foil (top foil) may be disposed between the shaft and the plurality of first foils such that the second foil extends in the circumferential direction to have a substantially cylindrical shape. Alternatively, it is possible to use the top foil in place of the plurality of first foils, and provide the top foil with the first magnet (in such a case, the top foil serves as the first foil).

In another embodiment of the present invention, the rotating member may comprise a disk-shaped member and the gap may be defined between the stationary mount member and a planar surface of the disk-shaped member. In such a case, by providing the disk-shaped member as a unitary portion of a rotor shaft of a gas turbine engine, the foil bearing can constitute a thrust bearing of the rotor shaft of the gas turbine engine.

Other and further objects, features and advantages of the invention will appear more fully from the following description.

BRIEF DESCRIPTION OF THE DRAWINGS

Now the present invention is described in the following with reference to the appended drawings, in which:

FIG. 6 is a cross sectional view similar to FIG. 2 and shows yet another embodiment of a foil bearing to which the present invention is applied;

FIG. 8 is a cross sectional view similar to FIG. 2 and shows still another embodiment of a foil bearing to which the present invention is applied;

FIG. 10 is a longitudinal cross sectional view for showing an embodiment of a gas turbine generator in that the present invention is applied to a thrust bearing;

FIG. 11 is a partial schematic view showing the thrust bearing in FIG. 10 along a circumferential direction;

DETAILED DESCRIPTION OF THE PREFERRED EMBODIMENTS

Figure 1:
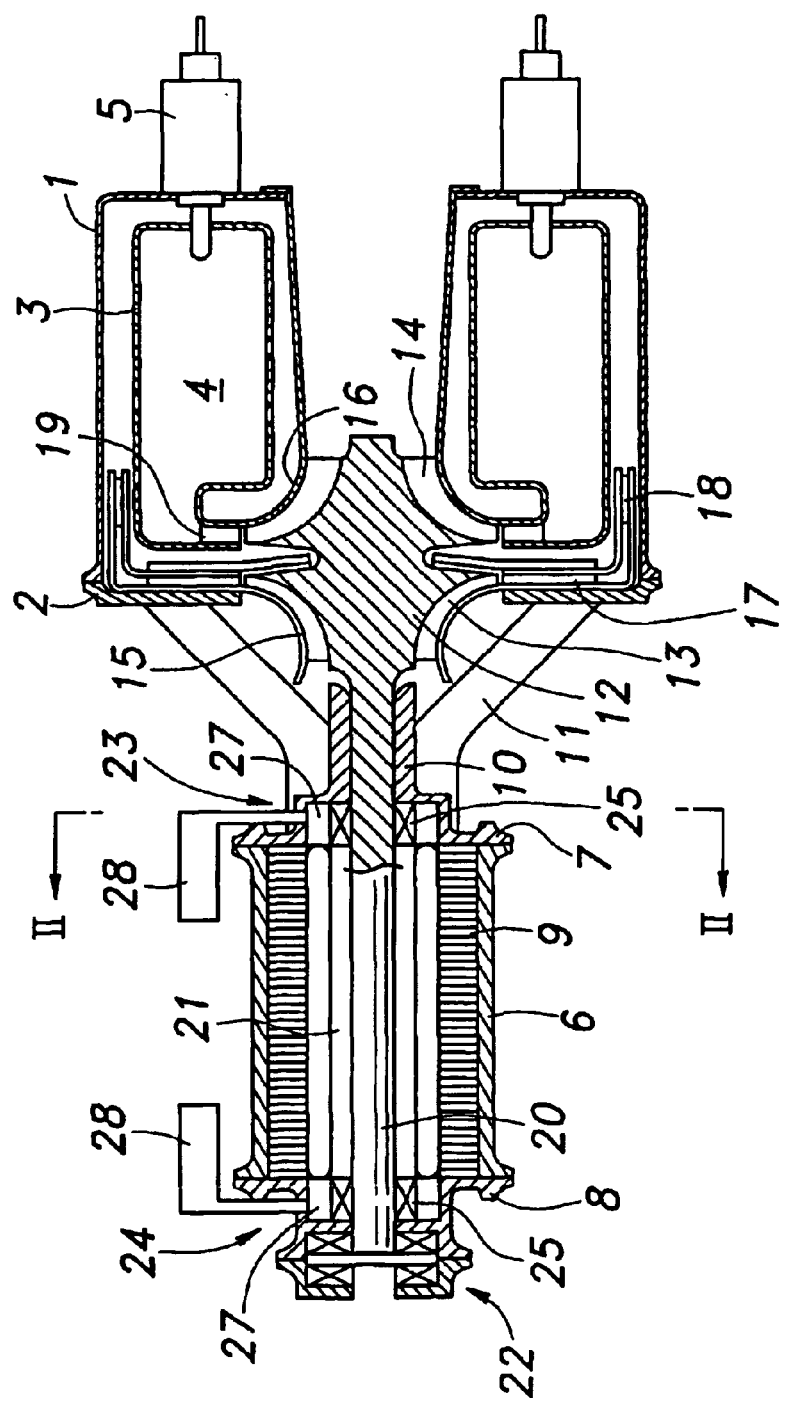
FIG. 1 is a longitudinal cross sectional view for showing an embodiment of a gas turbine generator to which the present invention is applied.

FIG. 1 is a longitudinal cross sectional view for showing a micro gas turbine generator to which the present invention is applied. The micro gas turbine generator includes a gas turbine engine as a power source and an electric generator driven by the gas turbine engine. The gas turbine engine comprises an annular main housing 1 of which end remote from the generator is closed, an end plate 2 attached to an open end of the main housing 1, a perforated annular inner housing 3 coaxially received inside the main housing 1 to define a combustion chamber 4 therein, and a plurality of fuel injectors 5 each having a nozzle end projecting into the combustion chamber 4.

The generator comprises a cylindrical main housing 6 and a pair of end plates 7 and 8 attached to either axial end of the main housing 6. The main housing 6 coaxially receives a stator coil 9 therein. The end plate 7 facing the gas turbine engine is provided with a tubular extension 10 extending centrally from the end plate 7 toward the gas turbine engine. Also, the end plate 7 facing the gas turbine engine is joined to the opposite end plate 2 of the gas turbine engine by a plurality of stay members 11.

The gas turbine engine is additionally provided with an integral rotor shaft 12 carrying a compressor wheel 13 and a turbine wheel 14. The compressor wheel 13 and turbine wheel 14 are composed of a plurality of compressor blades and turbine blades, respectively. The integral rotor shaft 12 of this embodiment is made of ceramic material, and is integrally formed with the compressor wheel 13 and turbine wheel 14 as a single-piece ceramic rotor assembly. Alternatively, the rotor shaft 12 may be implemented as an assembly comprising a plurality of individual component parts which may be made of a same material or different materials. The material for the turbine blades should be ceramic or other heat resistant material which may be either electroconductive or electrically insulating, and the choice of the material or materials depends on the particular configuration and specifications of the gas turbine engine. The axial length of this micro gas turbine engine is approximately 10 cm.

The compressor wheel 13 forms a radial compressor section in cooperation with a shroud 15 formed by a part of the end plate 2 attached to the gas turbine main housing 1. The inlet end of the compressor section opens out in the axial direction to face the generator. The outlet end of the compressor section communicates with a gap defined between the main housing 1 and the inner housing 3 via a diffuser 17 and an array of stator vanes 18 arranged in a circumferential direction.

The turbine wheel 14 forms a radial turbine section in cooperation with a turbine casing 16 formed by a part of the main housing 1. The inlet end of the turbine section communicates with an outlet end of the combustion chamber 4 via an inlet nozzle 19. The combustion chamber 4 in this embodiment extends from the inlet end of the turbine section in a direction away from the generator. The outlet end of the turbine section opens out in the axial direction facing away from the generator.

The integral rotor shaft 12 further comprises a generator shaft 20 which is an integral extension of the rotor shaft 12, and is passed centrally through the generator. Permanent magnet pieces 21 are mounted to the generator shaft 20 to form the main functional part of the generator in cooperation with the stator coil 9.

A thrust bearing 22 is provided at the end portion of the rotor shaft 12. Further, a pair of journal bearings 23, 24 according to the present invention are provided in the. end plates 7, 8 to rotatably support the rotor shaft 12 at two points.

Figure 2:
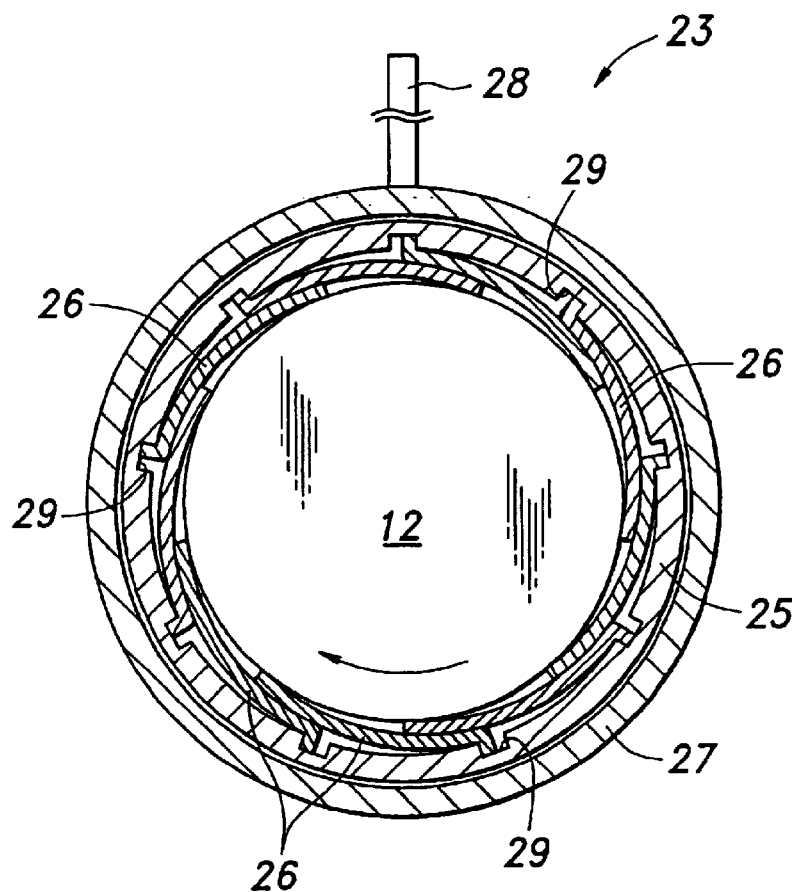
FIG. 2 is a cross sectional view taken along the lines II—II in FIG. 1.

FIG. 2 is a cross sectional view taken along the lines II—II in FIG. 1 and shows the journal bearing 23 in detail. It should be noted that in FIG. 2, the end plate 7 is omitted for clarity and the journal bearing 24 may have the same structure as the journal bearing 23. The journal bearing 23 comprises an annular stationary mount member 25 which surrounds the rotor shaft 12 (or generator shaft 20) serving as a rotating member such that a gap is defined between an inner surface of the mount member 25 and an outer surface of the rotor shaft 12, a plurality of foils 26 serving as first foils disposed in the gap between the rotor shaft 12 and the stationary mount member 25, an annular moveable member 27 surrounding the stationary mount member 25 and rotatable with respect to the stationary mount member 25 around an axis of the rotor shaft 12, and an operation bar 28 attached to the moveable member 27 for rotational operation therefor. The stationary mount member 25 is unrotatably secured to the end plate 7 by a suitable means. The operation bar 28 extends in a radial direction through a slit formed in the end plate 7 and can be controlled by a suitable control means not shown in the drawings in accordance with the rotational speed of the gas turbine engine, for example.

Each foil 26 is made of a flexible material such as a metal, and has one end received in a corresponding one of recesses 29 formed in an inner circumferential surface of the stationary mount member 25 so that the end is fixedly attached to the mount member 25. Each of the foils 26 is bent at a part near the attachment so that a main portion thereof extends in a circumferential direction substantially along the outer surface of the rotor shaft 12. In the embodiment shown in this drawing, a part of one foil 26 overlaps a part of a circumferentially neighboring foil 26, but in another embodiment each foil 26 may not overlap its neighboring foil 26. The foils 26 thus bent are urged toward the rotor shaft 12 due to their own elasticity. In the foil bearing constructed as above, as the rotor shaft 12 rotates in a direction indicated by an arrow in FIG. 2, a fluid such as ambient air is drawn between the rotor shaft 12 and the foils 26 whereby the rotor shaft 12 is supported with low friction.

Figure 4:
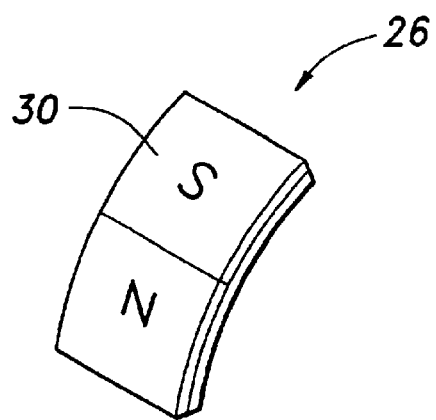
FIG. 4 is a perspective view showing a circumferentially extending portion of the foil shown in FIGS. 3a and 3b.
Figure 3A:
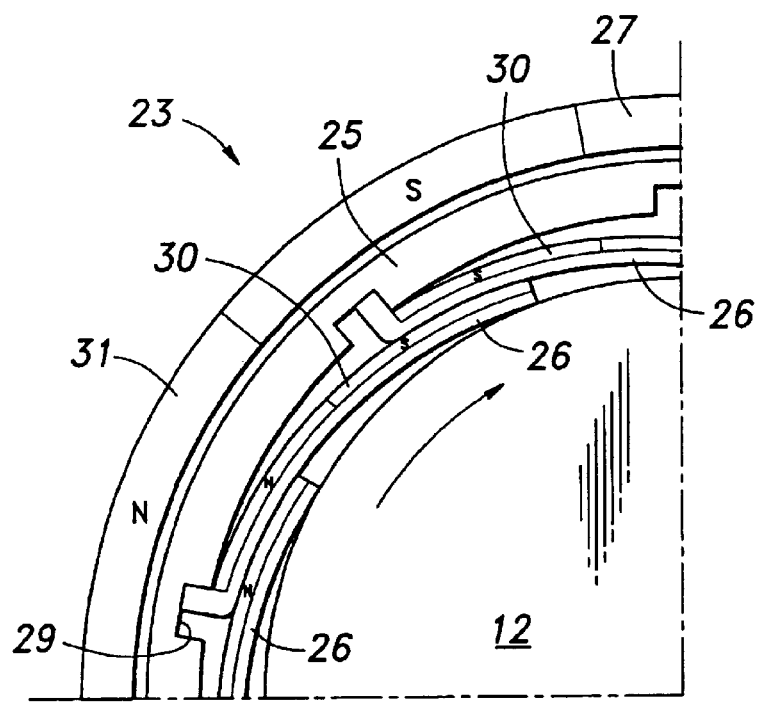
FIGS. 3a and 3b are enlarged cross sectional views for showing a preferred embodiment of a foil bearing according to the present invention in detail, in which a moveable member is shown at different angular positions.
Figure 3B:
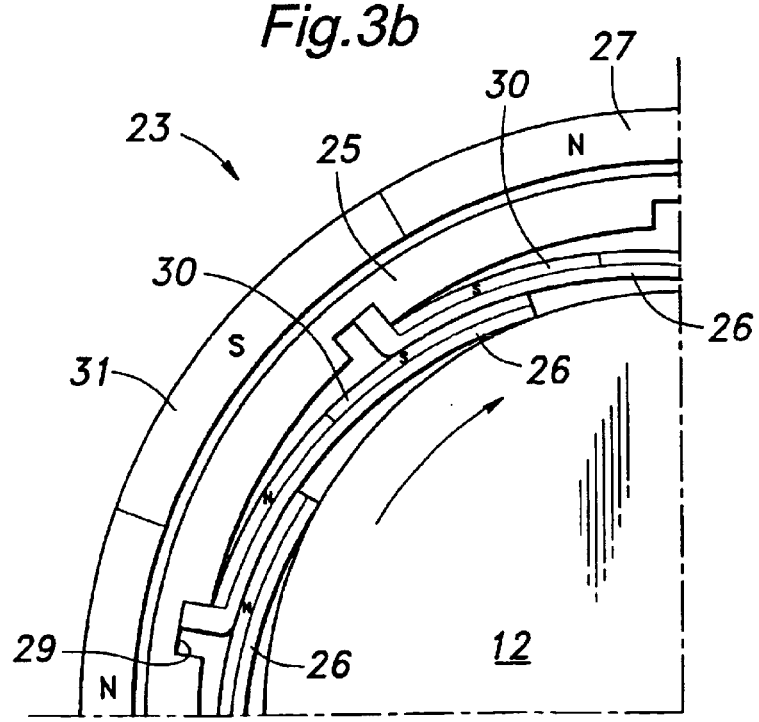

FIGS. 3a and 3b are enlarged partial views of FIG. 2 and show a detailed structure of an embodiment of the journal bearing 23 according to the present invention. As also shown in FIG. 4, a magnet (first magnet) 30 is provided to cover an substantially entire outer surface of the circumferentially extending portion of each foil 26 in such a manner that the S and N magnetic poles of the magnet 30 are arranged in the circumferential direction. This can be achieved by making the foil 26 of a magnetic material and suitably magnetize the same, or alternatively, attaching a plate-shaped magnet to a surface of the foil 26 by a suitable means. In this embodiment, the direction of magnetic pole arrangement of one foil 26 is opposite to that of an adjoining foil 26 whereby the overlapping portions assume the same magnetic polarity. Thus the N pole and S pole are arranged alternately in the circumferential direction for the whole foils 26. Further, the moveable member 27 is provided with a plurality of magnets (second magnets) 31 so that the N and S poles are arranged alternately in the circumferential direction. This can be also achieved by forming the moveable member 27 of a magnetic material and suitably magnetizing the same or by attaching plate-shaped magnets onto the inner surface of the moveable member 27. Preferably, a circumferential pitch (angle) of the magnetic pole of the magnets 31 provided to the moveable member 27 is substantially the same as that of the magnets 30 provided to the foils 26. It should be noted that the magnets 30 may be provided to an inner surface of each foil 26 although the interaction of the magnets 30 with the magnets 31 of the moveable member 27 would be weakened due to a larger distance therebetween.

In a state shown in FIG. 3a, the magnetic poles of a same polarity are aligned in the circumferential direction between the magnets 30 of the foils 26 and the magnets 31 of the moveable member 27, thus creating a repulsive force therebetween. This causes each foil 26 to be more strongly urged against the outer circumferential surface of the rotor shaft 12. This is practically equivalent to increasing the stiffness of each foil 26.

On the other hand, in a state shown in FIG. 3b, the moveable member 27 has been rotated with respect to the stationary mount member 25 and hence the foils 26 (counterclockwise in this drawing), so that each magnetic pole (e.g., S pole) of the magnets 31 of the moveable member 27 overlap the both magnetic poles (i.e., N pole and S pole) of the magnets 30 of the foils 26, creating both the attractive and repulsive forces which cancel each other. Thus, totally, no urging force is created from the magnetic interaction between the moveable member 27 and the foils 26 in this state.

As described, according to the above embodiment of the present invention, the interaction between the magnets 31 of the moveable member 27 and the magnets 30 provided to the circumferentially extending portions of the foils 26 can create a force for urging the foils 26 toward the rotor shaft 12, and an amount of the urging force acting upon the foils 26 can be adjusted by rotating the moveable member 27 and thereby varying the relative position thereof with respect to the foils 26. Thus, by controlling the angular position of the moveable member 27 according to the rotational speed of the gas turbine engine, for example, it is possible to provide an appropriate urging force (preload) depending on the rotational speed to thereby achieve a preferable bearing property for a wide range from low to high rotational speed regions. The urging force acts upon the circumferentially extending portion of each foil 26, and thus it is possible to prevent an excessive force from being applied on the root portion (bending portion) of the foil 26.

Figure 5A:
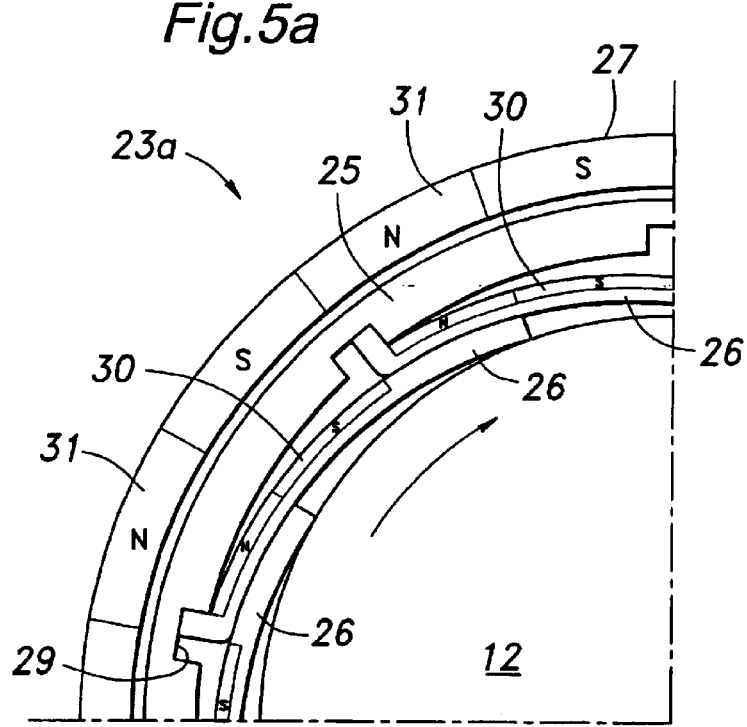
FIGS. 5a and 5b are enlarged cross sectional views for showing another embodiment of a foil bearing according to the present invention in detail, in which a moveable member is shown at different angular positions.
Figure 5B:
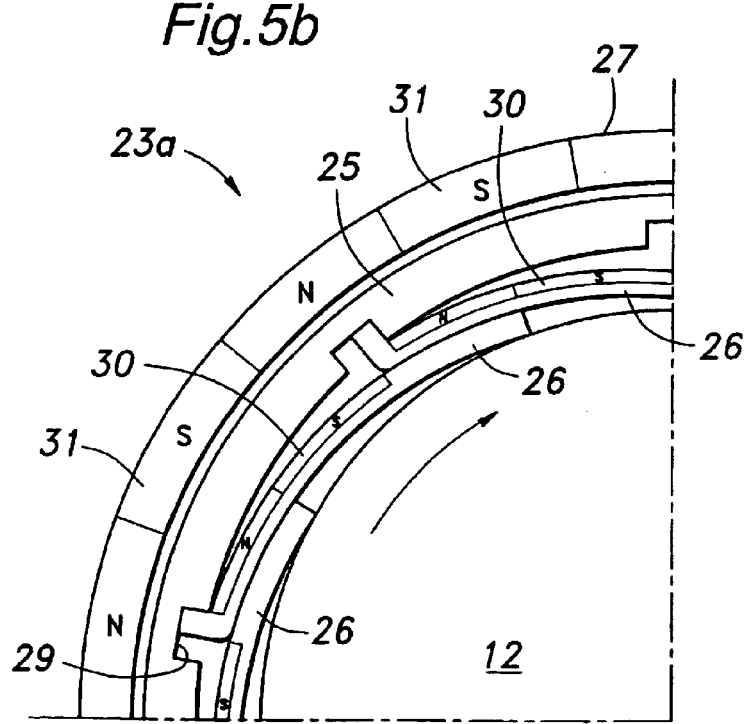

FIGS. 5a and 5b are enlarged partial views similar to FIGS. 3a and 3b and show another embodiment of a journal bearing embodying the present invention. In these drawings, component parts similar to those in FIGS. 3a and 3b are denoted with same reference numerals. The journal bearing 23a of FIGS. 5a and 5b differs from the embodiment of FIGS. 3a and 3b in a sense that the magnet 30 of each foil 26 does not occupy an entire part of the circumferentially extending portion of the foil 26 but takes up only a part (near the root portion) of the same such that the magnets 30 of adjacent pairs of the foils 26 do not overlap each other. Accordingly, the magnets 30 of the adjacent foils 26 assume the same circumferential orientation. In this embodiment also, the circumferential pitch (angle) of the magnetic poles of the magnets 31 provided to the moveable member 27 is substantially the same as that of the magnets 30 provided to the foils 26.

In a state shown in FIG. 5a, similarly to the state shown in FIG. 3a, the magnetic poles of a same polarity are aligned in the circumferential direction between the magnets 30 of the foils 26 and the magnets 31 of the moveable member 27, and the resulting repulsive force urges each foil 26 toward the outer circumferential surface of the rotor shaft 12.

In a state shown in FIG. 5b, similarly to the state shown in FIG. 3b, the moveable member 27 has been rotated so that each magnetic pole of the magnets 31 of the moveable member 27 overlap the both magnetic poles of the magnets 30 of the associated foils 26, and the mutually canceling attractive and repulsive forces result in substantially no magnetic force acting between the moveable member 27 and the foils 26. Thus, in the embodiment of FIGS. 5a and 5b, the amount of force urging the foils 26 toward the rotor shaft 12 can be varied by changing the position of the moveable member 27. Further, the urging force is applied on the circumferentially extending portion of each foil 26, and thus it is possible to prevent an excessive force from being concentrated on the root portion (bend portion) of the foil 26.

FIG. 6 is a cross sectional view similar to FIG. 2 and shows another embodiment of a journal bearing embodying the present invention. In this drawing, component parts similar to those in FIG. 2 are denoted with same reference numerals and detailed explanation thereof is omitted. This journal bearing 23b comprises a top foil (second foil) 32 having one end held by the stationary mount member 25 and extending in a circumferential direction to surround the approximately entire outer surface of the rotor shaft 12 and assume a substantially cylindrical shape. The foils (first foils) 26 attached to the stationary mount member 25 support the rotor shaft 12 via the top foil 32. In this embodiment, each of the foils 26 disposed in a gap between the stationary mount member 25 and the top foil 32 extends from its root portion in a direction opposite the direction of rotation of the rotor shaft 12. Further, adjacent foils 26 do not overlap each other. By providing the top foil 32, a frictional force is created between the top foil 32 and the foils 26, and the frictional force serves as Coulomb damping force that can contribute to improving rotational stability of the rotor shaft 12.

Figure 7A:
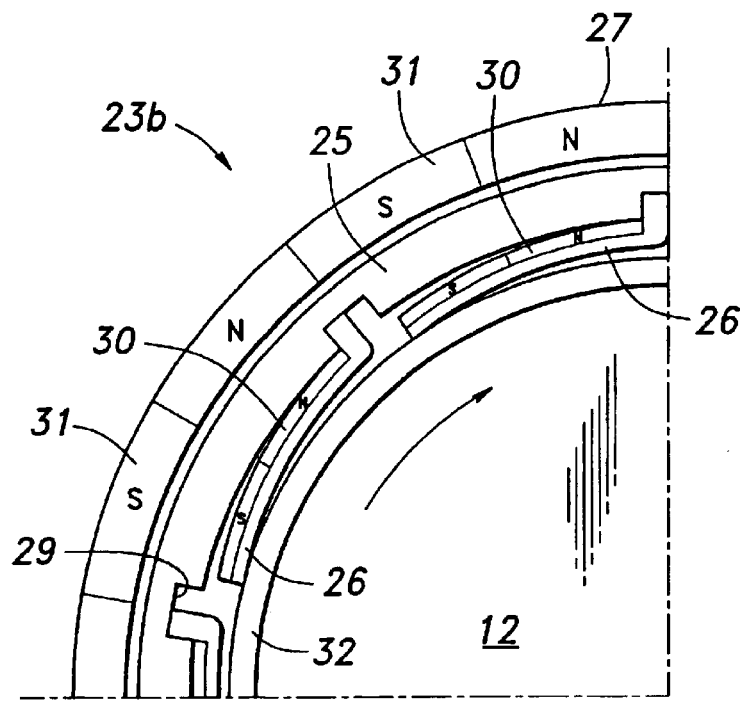
FIGS. 7a and 7b are enlarged cross sectional views for showing a detailed structure of the embodiment of the foil bearing shown in FIG. 6, in which a moveable member is shown at different angular positions.
Figure 7B:
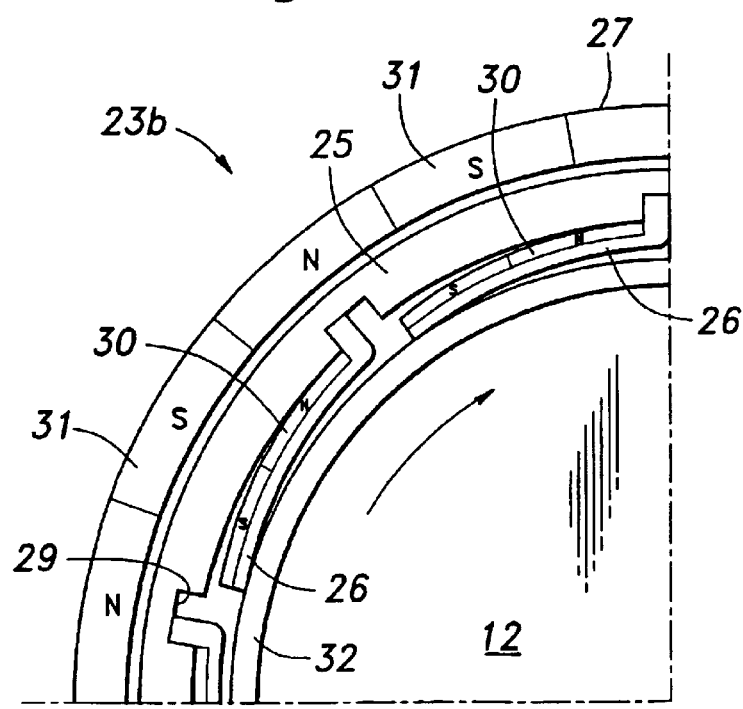

FIGS. 7a and 7b are enlarged partial cross sectional views for showing the journal bearing 23b of FIG. 6 more in detail. Similarly to the embodiments shown in FIGS. 3a, 3b and FIGS. 5a, 5b, each foil 26 disposed in a space between the stationary mount member 25 and the top foil 32 is provided with a magnet 30 having N and S magnetic poles arrange in a circumferential direction. Also, the moveable member 27 rotatably disposed outside the stationary mount member 25 is provided with a plurality of magnets 31 so that the N and S magnetic poles are arranged alternately in the circumferential direction. Owing to such a structure, in a similar manner explained with regards to the preceding embodiments, a force urging the foils 26 toward the top foil 32 (i.e., a force urging the top foil 32 into a smaller diameter) is created in a state of FIG. 7a, while in a state of FIG. 7b, substantially no such urging force is created from the magnetic interaction. Thus, it should be understood that the present invention can be applied to the embodiment using the top foil 32.

FIG. 8 is a cross sectional view similar to FIG. 2 and shows another embodiment of a journal bearing embodying the present invention. In this drawing also, component parts similar to those in FIG. 2 are denoted with same reference numerals and detailed explanation thereof is omitted. This journal bearing 23c also comprises the top foil 32 having one end held by the stationary mount member 25 and extending in the circumferential direction to surround the approximately entire outer surface of the rotor shaft 12 and assume a substantially cylindrical shape, but is not equipped with the foils 26 between the top foil 32 and the stationary mount member 25. In other words, in this embodiment, the top foil 32 functions as a first foil.

Figure 9A:
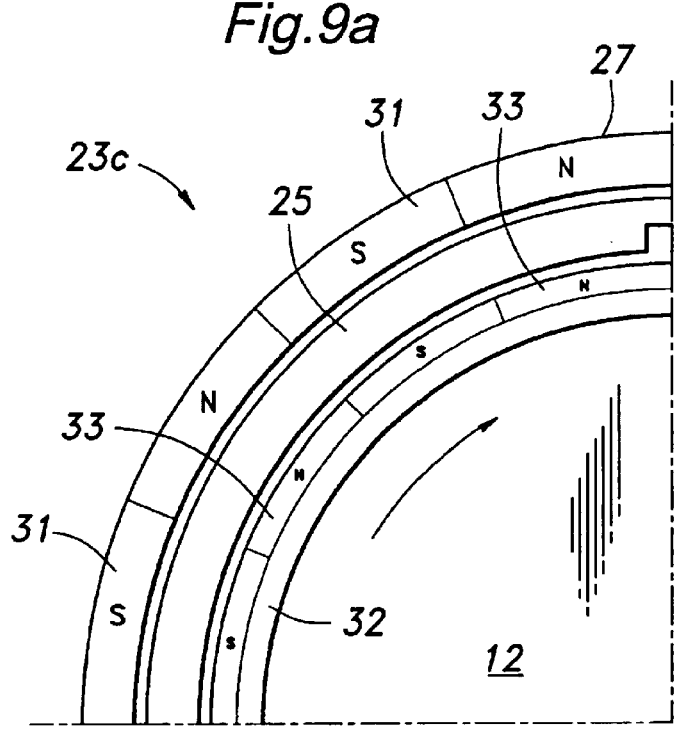
FIGS. 9a and 9b are enlarged cross sectional views for showing a detailed structure of the embodiment of the foil bearing shown in FIG. 8, in which a moveable member is shown at different angular positions.
Figure 9B:
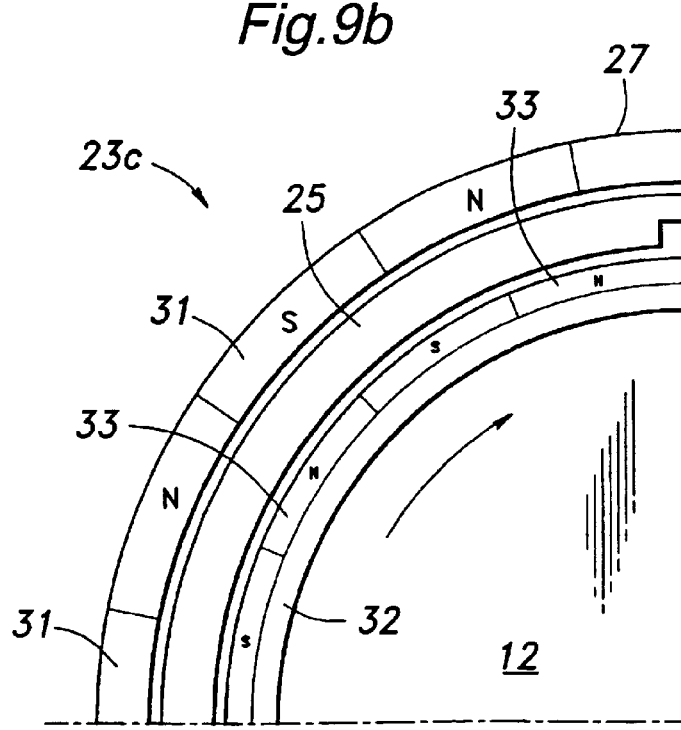

FIGS. 9a and 9b are enlarged partial cross sectional views for showing the journal bearing 23c of FIG. 8 more in detail. As shown in the drawings, a plurality of magnets 33 are provided on the outer surface of the top foil 32 so that the N and S magnetic poles are alternately arranged in the circumferential direction. The moveable member 27 is provided with the magnets 31 so that the angle pitch of the magnetic poles is the same as that of the top foil 32. Owing to such a structure, in a state of FIG. 9a, the (repulsive) magnetic force created between the magnets 33 of the top foil 32 and the magnets 31 of the moveable member 27 urges the top foil 32 toward the rotor shaft 12, while in a state of FIG. 9b, substantially no such urging force is created from the magnetic interaction. Thus, it is possible to apply the present invention to the embodiment comprising only the top foil 32 and vary the position of the moveable member 27 to adjust the amount of force for urging the top foil 32 toward the rotor shaft 12. The urging force acts upon the entire body of the top foil 32 and thus local concentration of an excessive force can be avoided.

FIG. 10 is a cross sectional view similar to FIG. 1. The gas turbine generator of FIG. 10 differs from that of FIG. 1 in a sense that the present invention is applied to the thrust bearing in FIG. 10 instead of the journal bearings. As shown the drawing, this thrust bearing 22a comprises a disk-shaped portion 35 unitarily provided to an end of the rotor shaft 12, and a pair of stationary mount members 36, 37 axially interposing the disk-shaped portion 35 therebetween. In other words, the disk-shaped portion 35 serves as a rotating member in this embodiment. One stationary mount member 36 is secured to the end plate 8 while the other stationary mount member 37 is securely received in a cover 38 which in turn is secured to the end plate 8. Although not shown in FIG. 10, a plurality of foils 39 are arranged in a circumferential direction between the disk-shaped portion 35 and each of the stationary mount members 36, 37, so that the foils 39 abut planar surfaces (surfaces facing in the axial direction) of the disk-shaped portion 35 (see FIG. 11). Further, a pair of moveable members 40, 41 are disposed on either side of the stationary mount members 36, 37 opposing the disk-shaped portion 35 in such a manner that the moveable members 40, 41 can rotate about the rotation axis of the rotor shaft 12 (and hence of the disk-shaped portion 35). Operation bars 42 are provided on outer cylindrical surfaces of the moveable members 40, 41 and extend radially through slots formed in the end plate 8 and cover 38. The operation bars 42 are controlled by an appropriate controller not shown, whereby the angular position of the moveable members 40, 41 can be varied according to the rotational speed of the gas turbine engine, for example.

FIG. 11 is a partial schematic view for showing the thrust bearing 22a more in detail and shows a part of the thrust bearing 22a along the circumferential direction. As shown, the plurality of foils 39 are disposed on a side of each stationary mount members 36, 37 facing the disk-shaped portion 35 to constitute a foil bearing. Each foil 39 is made of a flexible material, and one end thereof is fixedly received in an associated one of recesses 43 formed in the stationary mount members 36, 37. Each foil 39 is bent near the root end (or fixed end) thereof and its main portion extends substantially circumferentially in a direction of rotation of the disk-shaped portion 35 as indicated by an arrow in the drawing. In this embodiment, adjacent foils 39 do not overlap each other and are spaced from each other in the circumferential direction. As the rotor shaft 12 rotates together with the disk-shaped portion 35, a fluid such as ambient air is drawn in between the foils 39 and the disk-shaped portion 35 to form fluid films between the foils 39 and the opposing surfaces (planar surfaces) of the disk-shaped portion 35, which enables the disk-shaped portion 35 to rotate with low friction.

In this embodiment also, the circumferentially extending portion of each foil 39 is provided with a magnet (first magnet) 44 so that the N and S magnetic poles of the magnet 44 are arranged in the circumferential direction. Further, each of the moveable members 40, 41 is provided with a plurality of magnets (second magnets) 45 so that the N and S magnetic poles are alternately arranged in the circumferential direction. In this embodiment, the directions of arrangement of N and S magnetic poles of adjoining foils 39 are opposite to each other so that the circumferential pitch of the magnetic poles of the foils 39 corresponds to that of the moveable members 40, 41. Thus, it should be understood that the direction of arrangement of the N and S poles in each foil 39 can be determined arbitrarily depending on concrete design details such as the space between the adjacent foils 39, presence/absence of overlap between the adjacent foils 39, etc.

In a state shown in FIG. 11, a repulsive force is generated between the magnets 45 of the moveable members 40, 41 and the magnets 44 of the foils 39, and the force urges the foils 39 against the disk-shaped portion 35. Although the drawing is omitted, it will be appreciated that by rotating the moveable members 40, 41 in the circumferential direction, the amount of urging force resulting from the magnetic interaction can be varied in a manner similar to that of the above embodiments. This can make it possible to control the moveable members 40, 41 according to the rotational speed of the disk-shaped portion 35 (or rotor shaft 12), for example, to thereby adjust the urging force acting upon the foils 39 so that favorable bearing characteristics can be achieved in both the low and high rotational speed regions. Again, the urging force acts upon the circumferentially extending portion of each foil 39 and thus the excessive concentration of the load on the root portion of the foil 39 can be avoided. As described, the present invention can be favorably applied to the thrust bearing. It should be noted that although in this embodiment a foil bearing is constituted on each side of the disk-shaped portion 35, it may be possible to provide a foil bearing only on one side of the disk-shaped portion 35 when it is known that an axial force is imparted on the disk-shaped portion 35 in only one direction.

Figure 12:
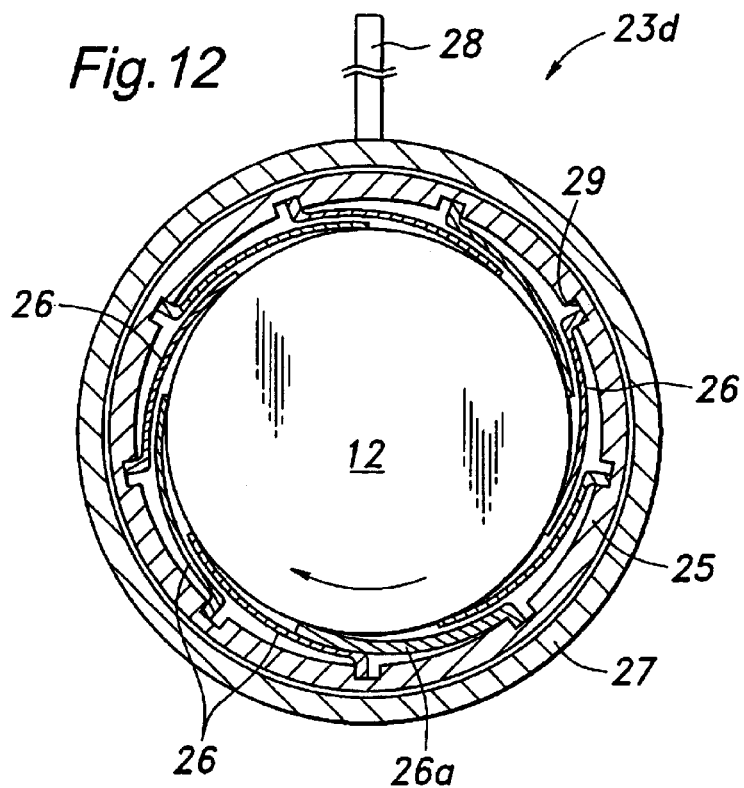
FIG. 12 is a cross sectional view similar to FIG. 2 and shows still another embodiment of a foil bearing to which the present invention is applied.
Figure 13:
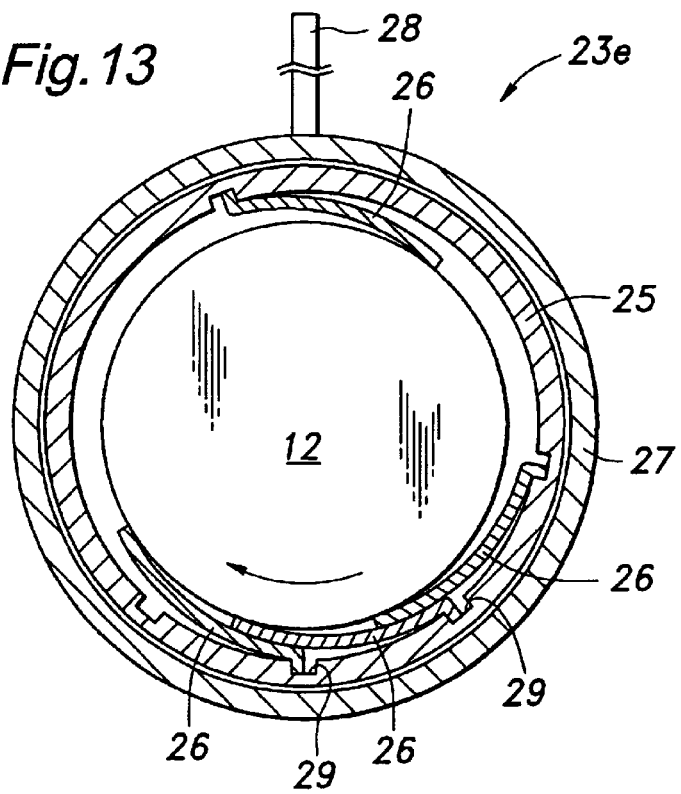
FIG. 13 is a cross sectional view similar to FIG. 2 and shows still another embodiment of a foil bearing to which the present invention is applied.

FIGS. 12 and 13 are cross sectional views similar to FIG. 2 and they each show yet another embodiment of the present invention. In these drawings, component parts similar to those in FIG. 2 are denoted with same reference numerals and detailed explanation thereof is omitted. In the journal bearing 23d of FIG. 12, a lowermost foil 26a is provided with a larger thickness than the other foils 26 and accordingly has a larger stiffness. This is because the lowermost foil 26a must support a larger load due to the gravity, and the larger stiffness of the lowermost foil 26a can compensate the effect of the gravity to thereby prevent an undesirable shift of the rotational axis of the rotor shaft 12. For a similar purpose, in the journal bearing 23e shown in FIG. 13, spaces between adjacent foils 26 are varied. Specifically, the foils 26 are disposed relatively closely (three foils in the drawing) on a lower side of the rotor shaft 12, and sparsely on an upper side of the same (only one foil in the drawing). Though not shown in the drawings, in these embodiments also, the foils 26 and the moveable member 27 may be provided with magnets as shown in FIG. 3, so that the urging force acting upon the foils 26 can be adjusted by varying the relative position between the foils 26 and the moveable member 27.

Although the present invention has been described in terms of preferred embodiments thereof, it is obvious to a person skilled in the art that various alterations and modifications are possible without departing from the scope of the present invention which is set forth in the appended claims.

For instance, all the foils may not be provided with magnets, and instead, only part of the foils may be provided with magnets. It may be also possible that in the foils disposed on the upper side of the rotor shaft, the magnet occupies only a part of the circumferentially extending portion of the foils while in the foils disposed on the lower side of the rotor shaft, upon which a larger load is applied, the magnet occupies an entire part of the circumferentially extending portion of the foils. The magnets provided to the foils and/or moveable member may have varying magnetic strengths. Further, each foil may be provided with more than one pair of NS magnetic poles, so that the magnetic poles are arranged in the order of NSNS, for example, in the circumferential direction.

As described above, according to the present invention, the interaction between the magnets provided to the moveable member and the magnets provided to the circumferentially extending portions of the foils can create a force urging the foils toward the rotating member, and the urging force can be adjusted by rotating the moveable member and thereby varying the position thereof relative to the foils. Thus, when the present invention is applied to the journal bearing and/or thrust bearing of a gas turbine engine, it is possible to control the angular position of the moveable member according to the rotational speed of the gas turbine engine, thereby creating an urging force (or preload) suitable for the rotational speed so that favorable bearing properties can be achieved for a wide range covering the low to high rotational speed regions. Further, the urging force acts upon the circumferentially extending portion of each foil, and thus concentration of an excessive force on the root portion (or bending portion) of the foil can be avoided.

What is claimed is:

1. A foil bearing for supporting a rotating member that rotates about an axis, comprising:

a stationary mount member spaced from the rotating member so that a gap is defined between the stationary mount member and the rotating member;

a moveable member rotatable about the axis; and a first foil disposed in the gap between the rotating member and the stationary mount member to support the rotating member via a fluid film when the rotating member rotates, wherein the first foil comprises a substantially circumferentially extending portion to which a first magnet is provided;

wherein the moveable member is provided with a second magnet so that a magnetic force between the first magnet and the second magnet can urge the first foil toward the rotating member; and wherein an amplitude of the magnetic force can be adjusted by rotating the moveable member around the axis to vary a relative circumferential position between the first magnet and the second magnet.

2. A foil bearing according to claim 1, comprising a plurality of the first foils arranged in a circumferential direction of the rotating member, and at least one of the plurality of first foils is provided with the first magnet.

3. A foil bearing according to claim 2, wherein each of the first foils is provided with the first magnet.

4. A foil bearing according to claim 3, wherein the moveable member is provided with a plurality of the second magnets which have varying magnetic strengths.

5. A foil bearing according to claim 3, wherein the first magnets provided to the plurality of first foils have varying magnetic strengths.

6. A foil bearing according to claim 2, wherein spaces between adjacent ones of the plurality of first foils are varied.

7. A foil bearing according to claim 1, wherein the rotating member comprises a shaft having a substantially cylindrical portion, and the stationary mount member surrounds the shaft so that the gap is formed as an annular gap defined between a cylindrical surface of the cylindrical portion of the shaft and the stationary mount member.

8. A foil bearing according to claim 7, wherein the shaft consists of a rotor shaft of a gas turbine engine, and the foil bearing constitutes a journal bearing for the rotor shaft of the gas turbine engine.

9. A foil bearing according to claim 7, comprising a plurality of the first foils arranged in a circumferential direction of the shaft, and the foil bearing further comprises a second foil disposed between the shaft and the plurality of first foils and extending in the circumferential direction to have a substantially cylindrical shape.

10. A foil bearing according to claim 7, wherein the first foil consists of a single member extending in a circumferential direction to have a substantially cylindrical shape.

11. A foil bearing according to claim 1, wherein the rotating member comprises a disk-shaped member and the gap is defined between the stationary mount member and a planar surface of the disk-shaped member.

12. A foil bearing according to claim 11, wherein the disk-shaped member is provided as a unitary portion of a rotor shaft of a gas turbine engine, and the foil bearing constitutes a thrust bearing of the rotor shaft of the gas turbine engine.

* * * * *